Jan. 16, 1951    B. C. MAIER    2,538,112
PLANTING SIGHT
Filed June 13, 1947
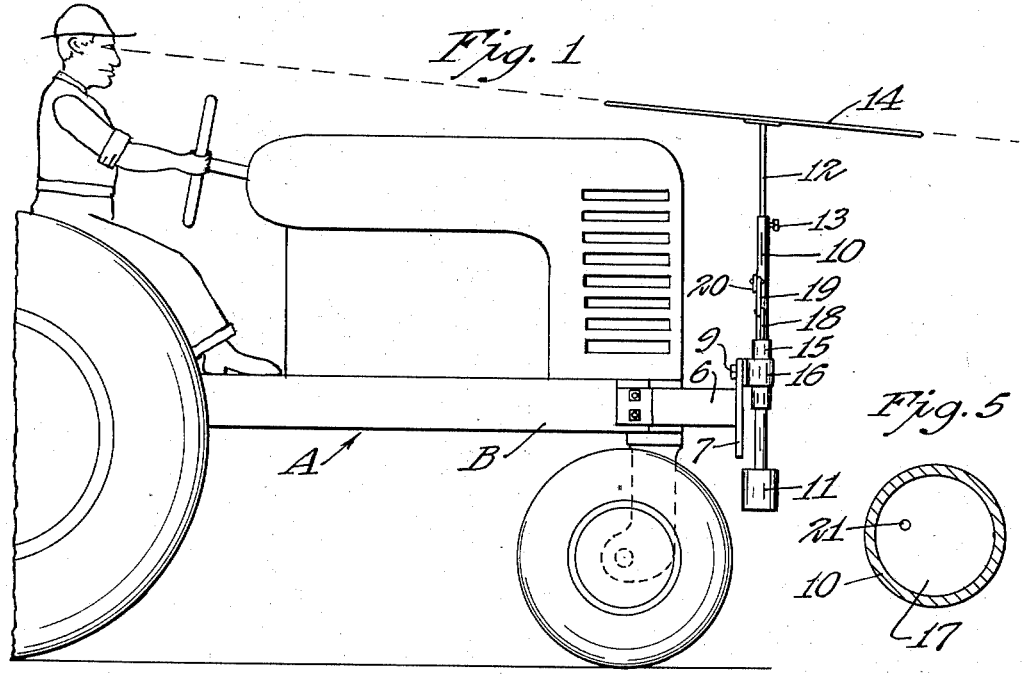
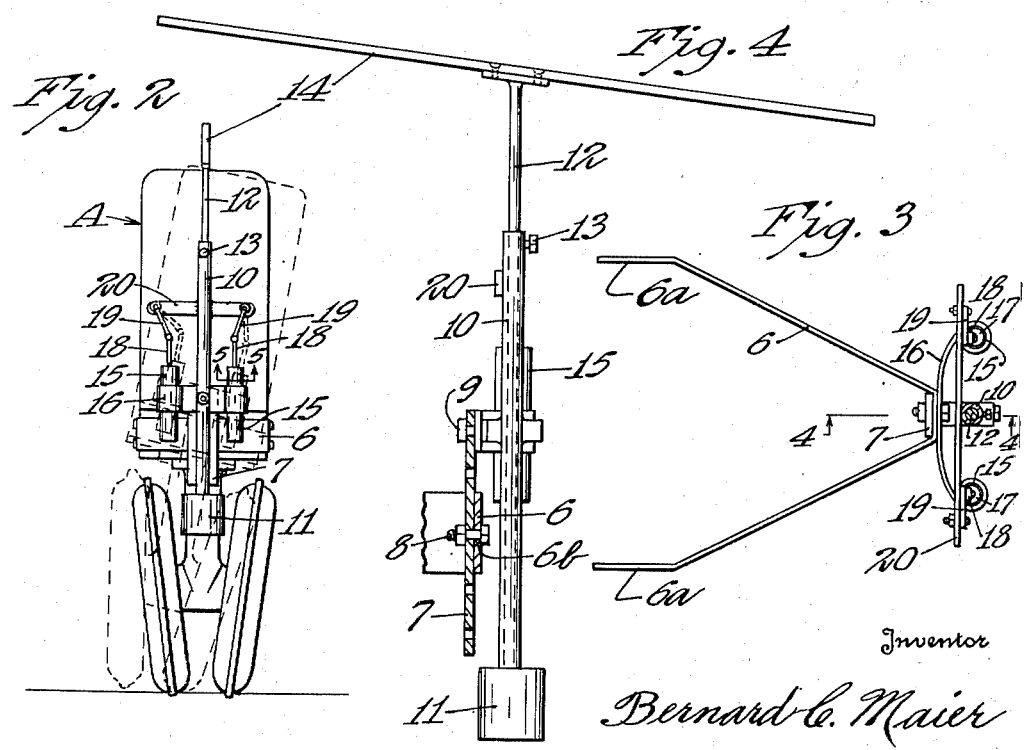
Inventor
Bernard C. Maier
By Williamson & Williamson
Attorneys Patented Jan. 16, 1951

2,538,112

UNITED STATES PATENT OFFICE 2,538,112

PLANTING SIGHT

Bernard C. Maier, Canby, Minn.

Application June 13, 1947, Serial No. 754,399

2 Claims. (Cl. 33—46)

This invention relates to a planting sight for farm tractors to facilitate planting crops in equally spaced rows.

It is a general object of my invention to provide a sighting device to enable farmers to plant equally spaced crop rows even along hillside contour lines.

It is another object to provide a sighting device adapted to be pivotally mounted at the front of a farm tractor, said device having a weight disposed below said pivotal mounting to maintain said sight in substantially upright position, whereby planting equally spaced crop rows may be greatly facilitated.

It is a further object of my invention to provide a planting sight mechanism adapted to be easily attached to the front of a farm tractor in pivotal relation to said tractor and having oscillation damping means connected therewith to maintain said pivoted sight in relative steady position.

These and other objects and advantages of my invention will be more apparent from the following description made in connection with the accompanying drawings, wherein like reference characters refer to similar parts throughout the several view and in which:

Figure 1 is a side elevational view of my device as attached to a farm tractor;

Figure 2 is a front end elevational view of the structure shown in Figure 1 showing the tractor in tilted position by dotted lines and in normal position by full lines;

Figure 3 is a top plan view of my planting sight attachment for farm tractor;

Figure 4 is a vertical sectional view taken along the line 4—4 of Figure 3; and

Figure 5 is a fragmentary horizontal sectional view taken along the line 5—5 of Figure 2 showing the damping piston construction in detail.

In Figures 1 and 2, I show a conventional farm tractor A having a longitudinal frame B and illustrating my planting sight as attached to the front of said frame B.

For my planting sight I provide a substantially U-shaped frame 6 made as from strap steel and having the flattened opposed rear end portions 6a adapted to be fixed to the sides of the front portions of the tractor frame B. A vertically adjustable bracket 7 is fixed to said frame 6 as by a removable bolt 8 therethrough. The bracket 7 has a plurality of vertically spaced apertures therethrough and the forward end of said U-frame 6 has a cooperating aperture 6b formed therein. A short stub shaft 9 is fixed to the top of said adjustable bracket 7. An elongated tube 10 has an intermediate portion thereof journaled on stub shaft 9 for free pivotal swinging movement on a horizontal axis substantially aligned with the longitudinal center line of said tractor. A suitable bearing is provided to permit free swinging movement of said tube 10.

A sight support rod 12 is telescopically mounted in tube 10 to form an upstanding arm and is adapted to be adjustably fixed at any desired height by thumb set screw 13. A heavy weight 11 is fixed to the bottom portion of said tube 10 a substantial distance below said stub shaft 9 to maintain said upstanding arm in a predetermined upright position. An elongated sighting member such as a sloping rod 14 is fixed to the top of adjustable support 12 and extends longitudinally of said tractor A.

A pair of fluid-containing cylinders or dash pots 15 are fixed to said vertical bracket 7 adjacent stub shaft 9 as by a suitable transverse bracket 16. Pistons 17 are respectively mounted to work in said cylinders 15. A pair of piston rods 18 are fixed respectively to the top of said pistons 17 and are respectively pivotally connected to the lower ends of cooperating links 19. A transverse bar 20 is fixed to said tube 10 above said stub shaft 9 and has the upper ends of cooperating links 19 pivotally connected respectively to the outer portions thereof.

Any suitable hydraulic fluid may be used in said cylinders and each of said pistons has a port 21 therein to permit restricted flow of said hydraulic fluid therethrough.

The operation of my planting sight attachment for farm tractors is more or less obvious from the drawings. In planting on level ground the tractor operator merely sights along the sighting rod 14 toward a point in line with the desired row of seeds to be planted at any desired spacing from the adjacent row of seeds already planted. My planting sight greatly facilitates maintaining a straight line for the row being planted. In operation, for planting along the contour lines of a hillside the tractor will of course be tilted according to the slope of said hillside. However, the weighted tube 10 will remain in substantially vertical position, swinging to said vertical position as the tractor is tilted from its normal level position. By maintaining the upstanding arm comprising tube 10 and support rod 12 in substantially vertical position the tractor operator may still sight along the sighting rod 14 to a point substantially aligned with the row of seeds being planted. Obviously, this would not be true if the tube 10 were not pivotally mounted on stub shaft 9 because there would be a considerable offset between the line of sight along the sighting rod 14 and the actual line of the row of seeds as they are planted from any suitable planting machine being towed by the tractor A, and due to this offset there would be extreme difficulty in maintaining accuracy of spacing between the rows of the crop being planted. However, it will be seen that with my device equal spacing between the crop rows during the planting operation may be easily maintained.

The damping cylinders 15 with pistons 17 working therein form a stabilizer and prevent the tube or upstanding arm 10 and the sight 14 from oscillating back and forth, and maintain said sight in relatively steady, stabilized vertical position, whereby greater accuracy of planting may be maintained.

It will be seen that I have provided an extremely simple, easily attached planting sight for farm tractors and the like, which will greatly facilitate maintaining equal spacing between the rows of the crop being planted even though the crop is being planted along the contour lines of a hillside field. It will also be seen that with my stabilizing mechanism the sight 14 may be maintained in relatively steady position while still permitting the tube or upstanding arm 10 to freely pivot on its intermediate pivot point about stub shaft 9 to maintain said upstanding arm 10 in steady, stabilized, substantially vertical position.

There are two adjustments whereby the height of the sight 14 may be controlled. The bolt 8 may be inserted through any one of the apertures formed in the vertical bracket 7 and thus control the height of the pivot shaft 9 along with the rest of the sight structure. The support rod 12 may also be adjusted by the telescopic connection between said tube 10 and rod 12 and by the thumb set screw 13. By lowering the pivot shaft 9 a slightly greater degree of accuracy can be maintained and the displacement between the sight bar 14 and the longitudinal center line of the tractor, or planting line, will be further reduced.

It will, of course, be understood that various changes may be made in the form, details, arrangement and proportions of the parts without departing from the scope of my invention.

What I claim is:

1. A planting sight attachment for farm tractors and the like comprising a horizontal pivot disposed longitudinally of a tractor and adapted to be mounted thereon, an upstanding arm pivoted on said horizontal pivot for swinging movement on only a horizontal axis disposed longitudinally of the tractor, an elongated sighting member connected to the upper portion of said upstanding arm and disposed longitudinally of the tractor, a weight fixed to said arm below said pivot point to maintain said arm in upright position even when the tractor is tilted laterally, and a dash pot having a plunger mounted therein and connected with said swingable upstanding arm to prevent sudden swinging movement thereof to stabilize the same.

2. A planting sight attachment for farm tractors and the like comprising a horizontal pivot disposed longitudinally of a tractor and adapted to be mounted thereon, an upstanding arm mounted on said horizontal pivot for swinging movement on only a horizontal axis disposed longitudinally of the tractor, an elongated sighting member fixed to the upper portion of said arm, and disposed longitudinally of the tractor, a weight fixed to said arm below said pivot to maintain said arm in upright position, even when the tractor is tilted laterally, and means for preventing the sudden swinging movement of the arm to stabilize the same.

BERNARD C. MAIER.

REFERENCES CITED

The following references are of record in the file of this patent:

UNITED STATES PATENTS

| Number | Name | Date |
|---|---|---|
| 338,678 | Sullivant | Mar. 23, 1886 |
| 706,175 | Hanneborg | Aug. 5, 1902 |
| 876,747 | Thurmond | Jan. 14, 1908 |
| 1,812,503 | Titterington | June 30, 1931 |
| 2,066,641 | Melior et al. | Jan. 5, 1937 |
| 2,198,864 | Degreile | Apr. 30, 1940 |
| 2,272,870 | McEvoy | Feb. 10, 1942 |
| 2,503,408 | Phillips | Apr. 11, 1950 |

FOREIGN PATENTS

| Number | Country | Date |
|---|---|---|
| 457,787 | France | July 22, 1913 |